United States Patent
Tai et al.

(10) Patent No.: US 10,761,739 B2
(45) Date of Patent: Sep. 1, 2020

(54) MULTI-LEVEL WEAR LEVELING FOR NON-VOLATILE MEMORY

(71) Applicant: Micron Technology, Inc., Boise, ID (US)

(72) Inventors: Ying Yu Tai, Mountain View, CA (US); Ning Chen, San Jose, CA (US); Jiangli Zhu, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 13 days.

(21) Appl. No.: 16/110,739

(22) Filed: Aug. 23, 2018

(65) Prior Publication Data

US 2020/0065007 A1 Feb. 27, 2020

(51) Int. Cl.
*G06F 3/06* (2006.01)
*G06F 12/10* (2016.01)

(52) U.S. Cl.
CPC ........... *G06F 3/0616* (2013.01); *G06F 3/065* (2013.01); *G06F 3/0659* (2013.01); *G06F 3/0679* (2013.01); *G06F 12/10* (2013.01); *G06F 2212/1036* (2013.01); *G06F 2212/202* (2013.01); *G06F 2212/657* (2013.01)

(58) Field of Classification Search
CPC ...... G06F 3/0679; G06F 3/0616; G06F 12/10; G06F 3/065; G06F 3/0659; G06F 3/06
USPC .................................. 711/170, 206, 165, 167
See application file for complete search history.

(56) References Cited

U.S. PATENT DOCUMENTS

| | | | | |
|---|---|---|---|---|
| 8,364,883 | B2* | 1/2013 | Bennett | G06F 12/0246 711/100 |
| 9,710,176 | B1* | 7/2017 | Tang | G06F 12/0246 |
| 2004/0083335 | A1 | 4/2004 | Gonzalez et al. | |
| 2008/0140918 | A1* | 6/2008 | Sutardja | G06F 12/0246 711/103 |
| 2010/0017649 | A1* | 1/2010 | Wu | G06F 11/108 714/6.11 |

(Continued)

FOREIGN PATENT DOCUMENTS

| | | |
|---|---|---|
| EP | 1713085 A1 | 10/2006 |
| KR | 10-2014-0017296 A | 2/2014 |

OTHER PUBLICATIONS

R. T. Short and H. M. Levy, "A simulation study of two-level caches," [1988] The 15th Annual International Symposium on Computer Architecture. Conference Proceedings, Honolulu, HI, USA, 1988, pp. 81-88.*

(Continued)

*Primary Examiner* — Pierre Miche Bataille
(74) *Attorney, Agent, or Firm* — Lowenstein Sandler LLP

(57) ABSTRACT

A memory sub-system performs a first wear leveling operation among a plurality of individual data units of the memory component after a first interval and performs a second wear leveling operation among a first plurality of groups of data units of the memory component after a second interval, wherein a first group of the first plurality of groups comprises the plurality of individual data units. The memory sub-system further performs a third wear leveling operation among a second plurality of groups of data units of the memory component after a third interval, wherein a second group of the second plurality of groups comprises the first plurality of groups of data units.

20 Claims, 6 Drawing Sheets

(56) References Cited

U.S. PATENT DOCUMENTS

| | | | |
|---|---|---|---|
| 2010/0185805 A1* | 7/2010 | Chen | G06F 12/0246 |
| | | | 711/103 |
| 2012/0278543 A1* | 11/2012 | Yu | G06F 3/0658 |
| | | | 711/103 |
| 2013/0138870 A1* | 5/2013 | Yoon | G11C 11/5621 |
| | | | 711/103 |
| 2013/0166827 A1 | 6/2013 | Cideciyan et al. | |
| 2013/0304865 A1* | 11/2013 | Dewing | H04L 67/14 |
| | | | 709/219 |
| 2014/0189284 A1 | 7/2014 | Hyuseinova et al. | |
| 2014/0237160 A1 | 8/2014 | Dong | |
| 2016/0378396 A1* | 12/2016 | Ramanujan | G06F 12/1027 |
| | | | 711/105 |
| 2017/0177470 A1 | 6/2017 | Gunnam | |
| 2017/0199769 A1* | 7/2017 | Jain | G06F 11/008 |
| 2017/0242597 A1* | 8/2017 | Huang | G06F 3/0616 |
| 2017/0256305 A1* | 9/2017 | Niu | G06F 12/023 |
| 2018/0060227 A1 | 3/2018 | Tang et al. | |
| 2018/0107386 A1 | 4/2018 | Ahn | |
| 2018/0113636 A1 | 4/2018 | Kwon et al. | |
| 2019/0073136 A1* | 3/2019 | Chang | G06F 3/0679 |
| 2019/0107957 A1 | 4/2019 | Helmick et al. | |
| 2019/0108889 A1* | 4/2019 | Gholamipour | G11C 13/0033 |

OTHER PUBLICATIONS

Layer Two Distribution and Load Balancing Techniques, IP.com Prior Art Database Technical Disclosure, Feb. 2017.*

International Search Report and Written Opinion for International Application No. PCT/US2019/047425, dated on Dec. 6, 2019, 11 pages.

International Search Report and Written Opinion for International Application No. PCT/US2019/047781, dated Dec. 6, 2019, 10 pages.

* cited by examiner

US 10,761,739 B2

MULTI-LEVEL WEAR LEVELING FOR NON-VOLATILE MEMORY

TECHNICAL FIELD

Embodiments of the disclosure relate generally to memory sub-systems, and more specifically, relate to multi-level wear leveling for non-volatile memory.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific embodiments, but are for explanation and understanding only.

DETAILED DESCRIPTION

Figure 1:
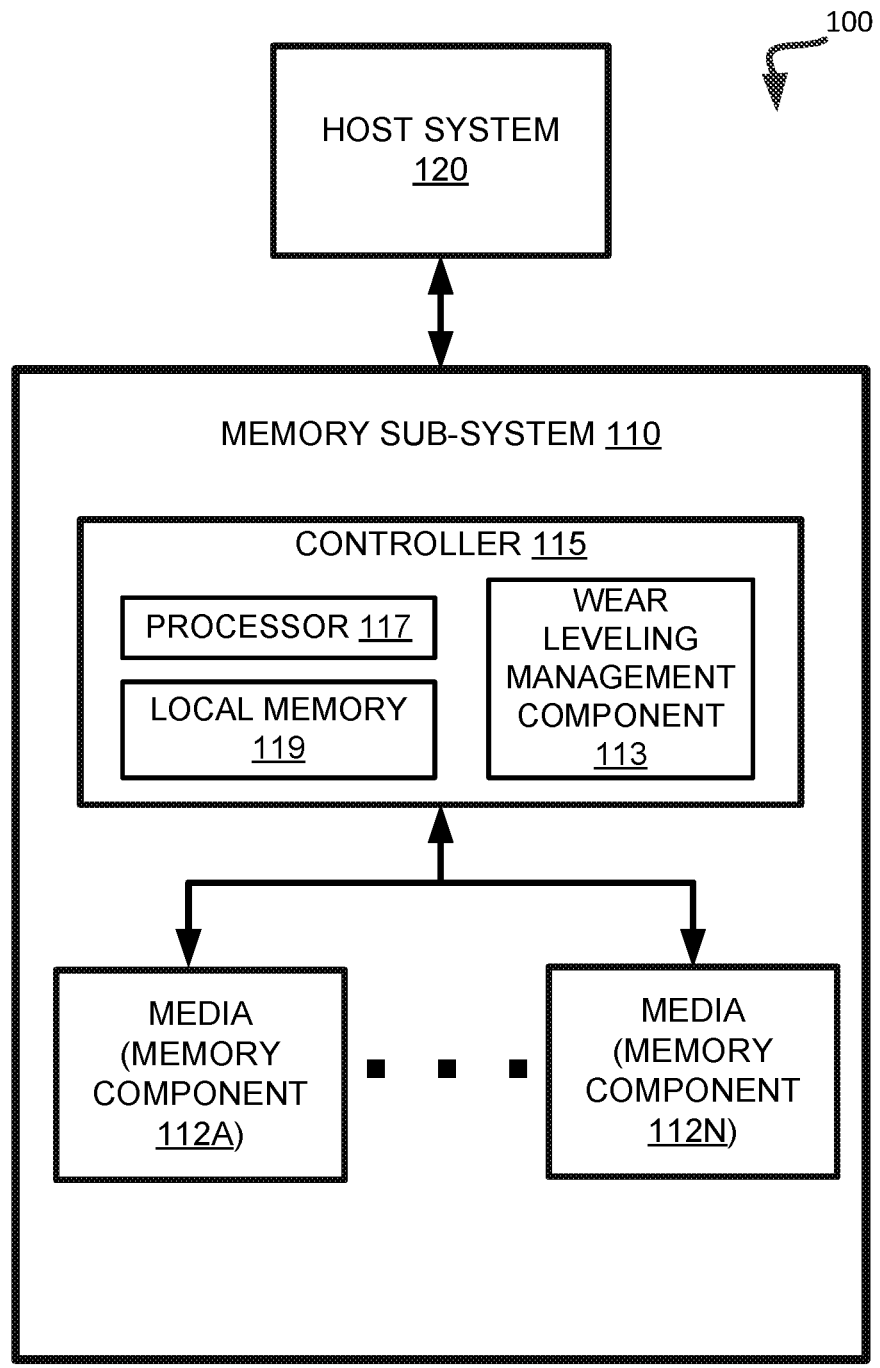
FIG. 1 illustrates an example computing environment that includes a memory system, in accordance with some implementations of the disclosure.

Aspects of the present disclosure are directed to multi-level wear leveling for non-volatile memory. A memory sub-system is also hereinafter referred to as a "memory device." An example of a memory sub-system is a storage system, such as a solid-state drive (SSD). In some embodiments, the memory sub-system is a hybrid memory/storage sub-system. In general, a host system can utilize a memory sub-system that includes one or more memory components. The host system can provide data to be stored at the memory sub-system and can request data to be retrieved from the memory sub-system.

The memory components used by the memory sub-system can have particular properties that provide challenges in the operation of the memory sub-system. For example, some memory components, such as non-volatile memory components, have limited endurance. The individual segments, data units, or blocks of the memory components can be written, read, and/or erased only a finite number of times before physical wear causes the memory components to fail. To counteract this limited endurance of memory components, techniques have been developed to manage wear on the memory components.

One technique of managing the endurance in a conventional memory sub-system is wear leveling. A wear leveling operation can attempt to evenly distribute the read, write and erase operations, and thus the corresponding physical wear, across the memory components. One memory component can be divided into some number of individual data units, such as pages or blocks of the memory component, which each experience physical wear. These data units can represent an individual segment of the memory component that can be written or erased in a single operation. Write counts (e.g., the number of times a write operation that writes data to a data unit is performed on the data unit during the lifetime of the data unit), read counts (e.g., the number of times a read operation that reads data from a data unit is performed on the data unit during the lifetime of the data unit), or erase counts (e.g., the number of times an erase operation that erases data from a data unit is performed on the data unit during the lifetime of the data unit) can be strong indicators of wear on the data units of memory components. Thus, conventional wear leveling techniques often use a sorting process to find data units with high read or write counts and data units with low read count or write counts. The data from a data unit having a high read or write count can be swapped with the data of a data unit having low read or write count in an attempt to evenly distribute the wear across the data units of the memory component.

Different types of memory components, however, can include varying numbers of data units. For example, a cross-point array of non-volatile memory cells, can have a significantly smaller data unit size than a flash-based memory component, and thus can have a significantly larger number of data units for a memory component of similar capacity. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Thus, such memory components can perform "in-place" data replacement. Since the number of data units in such a memory component is large, a significant amount of computing resources (e.g., processing and memory resources) are used to retrieve, store, and sort various count values associated with the memory component. Additionally, retrieving, storing, and sorting the large number of data units takes a proportionately large amount of time, which contributes significantly to latency of the memory sub-system.

Aspects of the disclosure address the above and other deficiencies by implementing multi-level wear leveling for non-volatile memory. In one implementation, multi-level wear leveling utilizes a hierarchy of levels of data units having different sizes. For example, a first level can represent individual data units, such as a data block or page of a memory component (which can also be referred to herein as a "management unit"), while a second level can represent a group of multiple data units (which can also be referred to herein as a "super management unit"). A third level can represent group of multiple groups of data units from the second level (i.e., a group of super management units). Depending on the embodiment, there can be any number of different levels in the hierarchy, each operating on successively larger groups of data units. Wear leveling can be performed at each level of the hierarchy using different wear leveling techniques and at different frequencies. For example, multi-level wear leveling can include wear leveling at the first level using algebraic mapping implemented by a first function every five minutes or every 1000 host writes, and wear leveling at the second level using algebraic mapping implemented by a second function every 30 minutes or every 5000 host writes. The second mapping function can be either the same or different than the first mapping function, depending on the embodiment. Wear leveling at the third level can be performed using algebraic mapping implemented by a third function or by using indirect fully associative mapping implemented by a look-up table every one hour or every 10,000 host writes. In other implementations, the wear leveling techniques and/or the associated frequencies can vary as appropriate. The multi-level wear leveling scheme described herein allows for efficient and effective wear leveling in memory sub-systems having high numbers of data units, such as when in-place data replacement media is used, and having large storage capacities without resulting in the look-up table used at the third level becoming excessively large in size. The processing and memory resources utilized for wear leveling, as well as data access latencies, are reduced, while the wear (e.g., number of operations performed on a memory component and/or an amount of data written to the memory component) on the multiple memory components of the memory sub-system can be more evenly distributed, preventing the premature failure of a particular memory component of a memory sub-system relative to the other memory components of the memory sub-system. Furthermore, there is smaller write amplification overhead and the memory footprint used for wear-leveling is reduced. Additional details of hybrid wear leveling are provided below with respect to FIGS. 1-5.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is an SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes a wear leveling management component 113 that can be used to implement multi-level wear leveling across the memory components 112A to 112N in the memory sub-system 110. In some embodiments, the controller 115 includes at least a portion of the wear leveling management component 113. For example, the controller 115 can include a processor 117 (processing device) configured to execute instructions stored in local memory 119 for performing the operations described herein. In some embodiments, the wear leveling management component 113 is part of the host system 120, an application, or an operating system.

The wear leveling management component 113 can perform multi-level wear leveling using a hierarchy of levels of data units having different sizes.

For example, a first level can represent individual data units, such as a data block or page of a memory component (i.e., a management unit), while a second level can represent a group of multiple data units (i.e., a super management unit). A third level can represent a group of multiple groups of data units from the second level (i.e., a group of super management units). Depending on the embodiment, there can be any number of different levels in the hierarchy, each operating on successively larger groups of data units. Wear leveling can be performed at each level of the hierarchy using different wear leveling techniques and at different frequencies. For example, wear leveling management component 113 can implement algebraic mapping with a first function at the first level at a first frequency, and can implement algebraic mapping with a second function at the second level at a second frequency. In addition, wear leveling management component 113 can implement either algebraic mapping with a third function or indirect fully associative mapping implemented by a look-up table at the third level at a third frequency. The algebraic mapping functions used at each level can be either the same or different, depending on the embodiment. In one implementation, the wear leveling is performed more often at the first level than at the second level, since the management units in the first level are smaller in size than the super management units in the second level, and also more often at the second level than at the third level. Further details with regards to the operations of the wear leveling management component 113 are described below.

In implementations, a wear leveling operation can include an operation that prolongs the service life of memory components 112A-112N (generally referred to as "memory component(s) 112" herein). For example, a wear leveling operation can attempt to evenly distribute the physical wear across the set of data units of memory components 112. A data unit can refer to an amount of physical memory of memory components 112.

Figure 2A:
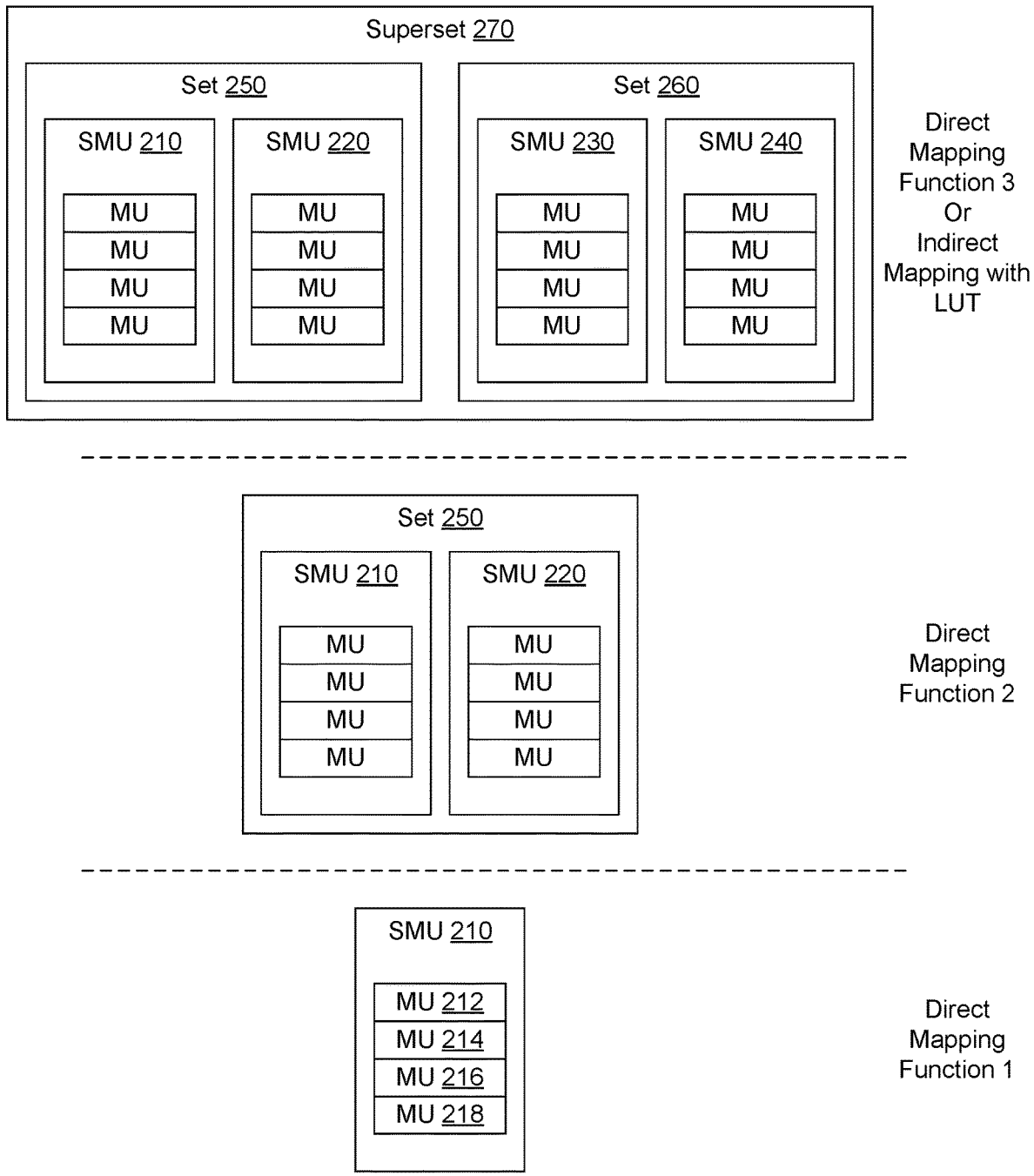
FIG. 2A illustrates different levels of hierarchical data units in a memory component, in accordance with some implementations of the disclosure.

FIG. 2A illustrates different levels of hierarchical data units in memory components 112. Management units (MUs) are one example of a data unit. For example, a management unit can be a page (e.g., smallest unit of data that can be written to or read from a cross-point array) of a cross-point array of non-volatile memory or a block (e.g., smallest unit of data that can be erased in flashed-based memory) of flash-based memory. Super management units (SMUs) are another example of data units, and can include a set of multiple management units (e.g. 1000 MUs). The set of data units can be the data units that make up the one or more memory components 112. For example, the set of data units of memory components 112 can be all or a majority of the pages or blocks of memory components 112. FIG. 2A illustrates an example of three levels in the multi-level hierarchy. At the first (lowest) level, wear leveling management component 113 performs wear leveling among multiple individual data units (i.e., management units 212, 214, 216, and 218) within a single super management unit 210. The hierarchy can actually include numerous super management units, but wear leveling management component 113 operates within each one individually at the first level. In addition, only a limited number of management units are illustrated, but in practice there can be any number of super management units, each containing any number of management units (e.g., 500, 1000, 2000). At the second (middle) level of the hierarchy, wear leveling management component 113 performs wear leveling among multiple groups of data units (i.e., super management units 210 and 220), each containing a number of individual management units. In one embodiment, the groups of data units are part of a larger group referred to as set 250.). At the third (top) level of the hierarchy, wear leveling management component 113 performs wear leveling among multiple groups of groups of data units (i.e., sets 250 and 260), each containing a number of super management units. For example, set 250 includes super management units 210 and 220, while set 260 includes super management units 230 and 240. In one embodiment, the larger groups of sets of data units are referred to as superset 270.

In one embodiment, hybrid wear leveling management component 113 can perform wear leveling at each level of the hierarchy using different wear leveling techniques and at different frequencies. For example, hybrid wear leveling management component 113 can perform intra-SMU wear leveling among the management units 212, 214, 216, and 218 of super management unit 210 at the first level using a first algebraic mapping function at a first frequency. In addition, hybrid wear leveling management component 113 can perform inter-SMU wear leveling among the super management units 210 and 220 using a first algebraic mapping function at a second, less frequent, frequency. Furthermore, hybrid wear leveling management component 113 can perform inter-set wear leveling among the sets 250 and 260 of super management units using either a third algebraic mapping function or using indirect fully associative mapping implemented by a look-up table at a third, even less frequent, frequency.

In some implementations, a wear leveling operation can rewrite data of a data unit having a high wear metric to another data unit having a lower wear metric, or vice versa (e.g., rewrite data of a data unit having a low wear metric to another data unit having a higher wear metric). In implementations, a wear metric can be indicative of a level of physical wear on a data unit. Some examples of wear metrics can include write count, read count, or a combination of write count and read count.

In some implementations, a wear metric can include a combination of a write count and a read count. For example, the wear metric can include both the write count and the read count for a particular data unit where the write count and read count are combined using one or more equations. The physical wear on a data unit cause by a read operation can be less than the physical wear caused by a write operation. To combine the read count and write count for a data unit, the read count or write count for a data unit can be normalized (e.g., adjusting counts measured by different scales to a common scale) by weighting the write count or the read count. For instance, a read count for a data unit can be multiplied by a fraction (e.g., 0.8) to determine the equivalent number of write counts that the read counts represents in terms of wear. The weighted read count and the write count for the data unit can be combined (e.g., added) and be used as a wear metric indicative of the physical wear on the particular data unit.

In some implementations, memory components 112 can include non-volatile memory devices, such a non-volatile memory devices that include a cross-point array of non-volatile memory cells. As noted above, a cross-point array of non-volatile memory can perform bit storage based on a change of bulk resistance, in conjunction with a stackable cross-gridded data access array. Additionally, in contrast to many flash-based memories that perform write out-of-place operations (e.g., data at location that is to be written is erased before other data can be programmed to the location), cross-point non-volatile memory can perform a write in-place operation, where a non-volatile memory cell can be programmed without the non-volatile memory cell being previously erased. It can be noted that the wear metrics for cross-point non-volatile memory may not include an erase count due to the ability of the cross-point non-volatile memory to perform write-in place operations. An erase count can be a value indicating the number of times a memory operation, such as an erase operation that erases data of a data unit, is performed on the data unit during the lifetime of the data unit. Aspects of the disclosure can be applied to other types of non-volatile memory devices or other types of memory devices.

Figure 2B:
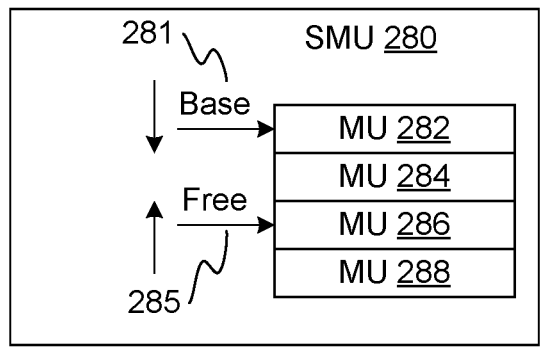
FIG. 2B illustrates wear leveling to be performed using algebraic mapping, in accordance with some implementations of the disclosure.

FIG. 2B illustrates wear leveling to be performed using algebraic mapping, in accordance with some implementations of the disclosure. In one embodiment, an algebraic function can be used to determine an appropriate physical location to which data can be moved in the wear leveling operation (e.g., Fn(Logical MU Index)=Physical MU Index). Depending on the embodiment, the algebraic mapping function can include at least one of a swap function, a circular shift function, a linear function utilizing a base pointer value and a free pointer value, or some other appropriate function. Since the function results in algebraic mapping of a logical index to a new physical location, this wear leveling can be performed at the first level or the second level of the hierarchy more often than at higher levels and with lower resource utilization. In one embodiment, wear leveling management component 113 maintains a base pointer value 281 and a free pointer value 285 for super management unit 280 comprising management units 282, 284, 286, and 288. The base pointer value 281 indicates the location of the beginning of the super management unit 280 (i.e., the location of the first management unit 282). The free pointer value 285 indicates the location of an available space for data storage within the super management unit 280 (i.e., the location of the management unit 286). In one embodiment, wear leveling management component 113 increments the free pointer value 285 after every N_free writes, where N_free can be a fixed number, a random number or a pseudo-random number. Wear leveling management component 113 further decrements the base pointer value 281 after every N_base steps, where N_base represents the size of super management unit 280. Thus, in one embodiment, the algebraic mapping function can be represented as:

if (Logical MU Index+Base Pointer)mod SMU Size>Free Pointer,

Physical MU Index=(Logical MU Index+Base Pointer)mod SMU Size; else,

Physical MU Index=(Logical MU Index+Base Pointer)mod SMU Size+1

Figure 2C:
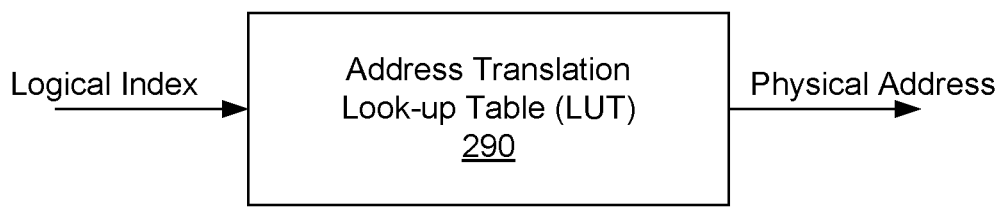
FIG. 2C illustrates wear leveling to be performed using indirect mapping, in accordance with some implementations of the disclosure.

FIG. 2C illustrates wear leveling to be performed using indirect mapping, in accordance with some implementations of the disclosure. With indirect mapping addition information is used to determine the target physical location on the memory component 112. In one embodiment, wear leveling management component 113 copies data from the super management unit to an available physical location on the memory component 112. This physical location can be determined in any number of ways, such as a location having a lowest write count, a location having been least recently accessed, etc. A list of available locations can be maintained in a free pool stored in local memory 119. Upon copying the data, wear leveling management component 113 records a mapping of a logical index associated with the data from the super management unit to the available physical index in a look-up table 290. In one embodiment, the look-up table 290 is maintained in local memory 119 of controller 115. Thus, when the logical index is applied to look-up table 290, the corresponding physical address is output. In other embodiments, the mapping can be maintained in some other type of data structure, such as an array, linked list, etc. Since the indirect mapping utilizes local memory 119 and has an associated access latency, this wear leveling operation can be performed at the third level of the hierarchy less often than at lower levels.

Figure 3:
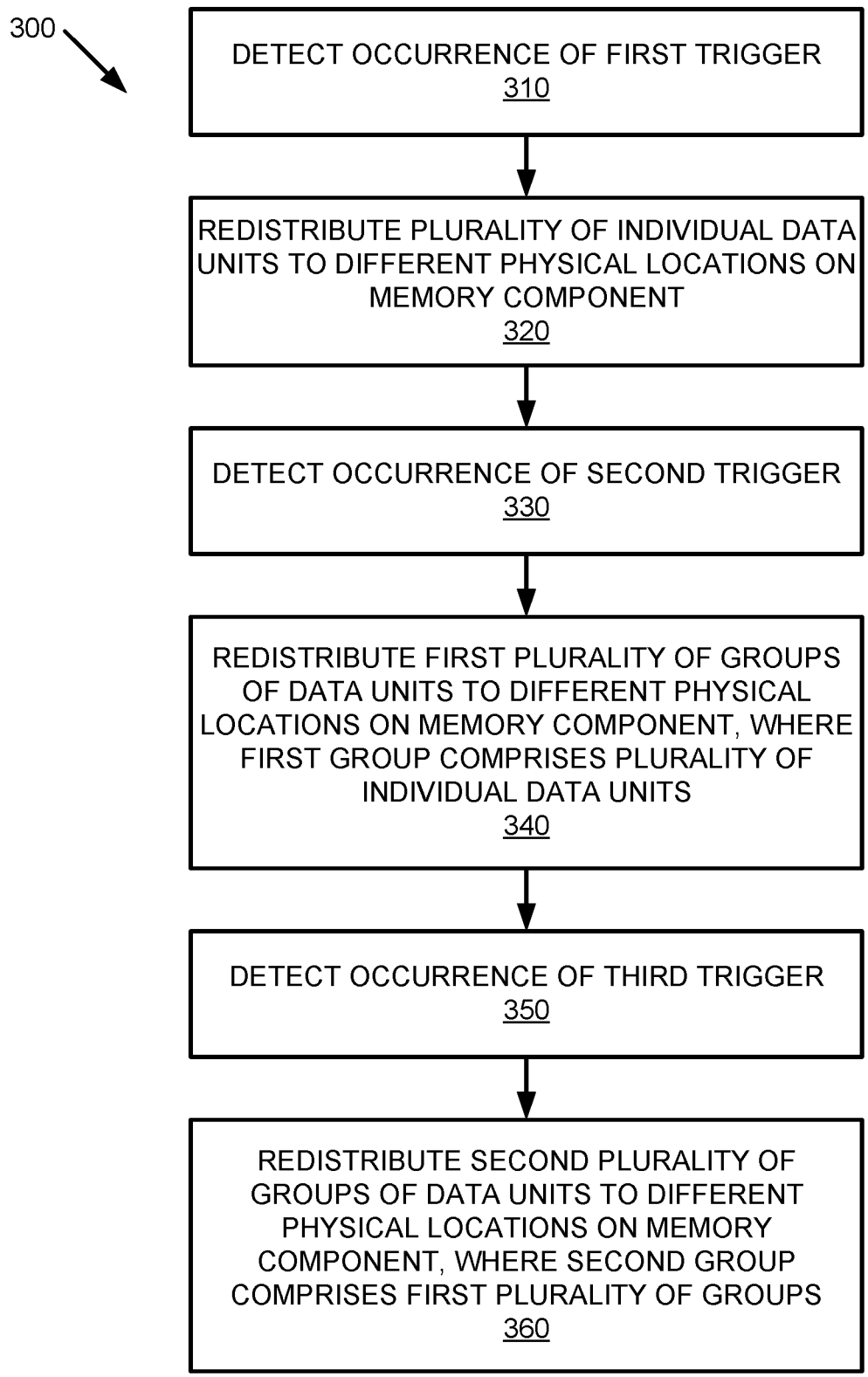
FIG. 3 is a flow diagram of an example method to perform multi-level wear leveling for non-volatile memory, in accordance with some embodiments of the present disclosure.

FIG. 3 is a flow diagram of an example method 300 to perform multi-level wear leveling for non-volatile memory, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the wear leveling management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 310, the processing device detects an occurrence of a first trigger. The first trigger can cause wear leveling management component 113 to initiate a wear leveling operation for a first level of the hierarchy of levels shown in FIG. 2A. In one embodiment, the first level can be the lowest level in the hierarchy and can include the smallest data units of the memory component 112 that are controllable by controller 115. In one embodiment, these data units can include management units, such as a data block or page of memory component 112. In one embodiment, the first trigger is based on at least one of a period of time that has elapsed since a previous wear leveling operation or a number of data write operations performed on the memory component 112 at the request of host system 120 since the previous wear leveling operation was performed. In one embodiment, controller 115 includes a timer which is reset each time a wear leveling operation is performed on the first level. Controller 115 can notify wear leveling management component 113 each time the timer expires or reaches a predetermined value. The timer can have a configurable value which can be adjusted according to the particular memory sub-system 110 (e.g., 1 minute, 5 minutes, 10 minutes, etc.). This notification can trigger wear leveling management component 113 to initiate the wear leveling operation. In one embodiment, controller 115 includes a counter which is incremented (or decremented) each time a write request is received from host system 120 and executed on memory component 112. Controller 115 can notify wear leveling management component 113 each time the counter reaches a predetermined value (e.g., 500 writes, 1000 writes, 2000 writes, etc.). This notification can trigger wear leveling management component 113 to initiate the wear leveling operation.

At block 320, the processing device redistributes a plurality of individual data units within a first group of data units to different physical locations on a memory component 112A according to an algebraic mapping function. The algebraic mapping function can be part of a wear leveling operation and can include any mathematical function, such as an algebraic function, that is complete in and of itself and does require the use of any additional information in order to determine the target physical location in memory component 112A. In one embodiment, wear leveling management component 113 applies a first logical index associated with data from one of the data units in the first level of the hierarchy to the algebraic mapping function to determine a physical index corresponding to a physical location on the memory component 112A and then copies the data from the data management unit to that physical location. In one embodiment, the algebraic mapping function comprises at least one of a swap function, a circular shift function, a linear function utilizing a base pointer value and a free pointer value, or some other appropriate function. Since the function results in an algebraic mapping of the logical index to a new physical location, this wear leveling operation can be performed at the first level of the hierarchy more often than at higher levels and with lower resource utilization.

At block 330, the processing device detects an occurrence of a second trigger, wherein the second trigger occurs less frequently than the first trigger. The second trigger can cause wear leveling management component 113 to initiate a wear leveling operation for a second level of the hierarchy of levels. In one embodiment, the second level can be a higher level in the hierarchy and can include larger data units of the memory component 112A that are controllable by controller 115. In one embodiment, these data units can include super management units, such as a group of data blocks or pages of memory component 112A. In one embodiment, the second trigger is also based on at least one of a period of time that has elapsed since a previous wear leveling operation or a number of data write operations performed on the memory component 112A at the request of host system 120 since the previous wear leveling operation was performed. For example, controller 115 can notify wear leveling management component 113 each time the timer expires or reaches a predetermined value (e.g., 1 hour, 2 hours, 12 hours, 24 hours, etc.) or each time the write counter reaches a predetermined value (e.g., 5000 writes, 10,000 writes, 20,000 writes, etc.). This notification can trigger wear leveling management component 113 to initiate the wear leveling operation.

At block 340, the processing device redistributes a first plurality of groups of data units to different physical locations on a memory component 112A according to an algebraic mapping function, wherein a first group of the first plurality of groups comprises the plurality of individual data units. As discussed above, the algebraic mapping function can be part of a wear leveling operation and can include any mathematical function, such as an algebraic function, to determine the target physical location in memory component 112A. In one embodiment, wear leveling management component 113 applies a first logical index associated with data from one of the groups of data units in the second level of the hierarchy to the algebraic mapping function to determine a physical index corresponding to a physical location on the memory component 112A and then copies the data from the super management unit to that physical location. In one embodiment, the algebraic mapping function comprises at least one of a swap function, a circular shift function, a linear function utilizing a base pointer value and a free pointer value, or some other appropriate function. Depending on the embodiment, the algebraic mapping function used at block 340 can be either the same or different that the algebraic mapping function used at block 320.

At block 350, the processing device detects an occurrence of a third trigger, wherein the third trigger occurs less frequently than the second trigger. The third trigger can cause wear leveling management component 113 to initiate a wear leveling operation for a third level of the hierarchy of levels. In one embodiment, the third level can be a higher level in the hierarchy and can include larger data units of the memory component 112A that are controllable by controller 115. In one embodiment, these data units can include groups of super management units. In one embodiment, the third trigger is also based on at least one of a period of time that has elapsed since a previous wear leveling operation or a number of data write operations performed on the memory component 112A at the request of host system 120 since the previous wear leveling operation was performed.

At block 360, the processing device redistributes a second plurality of groups of data units to different physical locations on the memory component 112A, wherein a second group of the second plurality of groups comprises the first plurality of groups of data units. Depending on the embodiment, wear leveling management component 113 uses either a third algebraic mapping function or uses indirect mapping. With indirect mapping addition information is required in order to target the target physical location on memory component 112A. In one embodiment, wear leveling management component 113 copies data from the group of super management units to an available physical location on the memory component 112A. This physical location can be determined in any number of ways, such as a location having a lowest write count, a location having been least recently accessed, etc. Upon copying the data, wear leveling management component 113 records a mapping of a logical index associated with the data from the group of super management units to the available physical location in a look-up table. In one embodiment, the look-up table is maintained in local memory 119 of controller 115. In other embodiments, the mapping can be maintained in some other type of data structure, such as an array, linked list, etc. Since the indirect mapping utilizes local memory 119 and has an associated access latency, this wear leveling operation can be performed at the third level of the hierarchy less often than at lower levels.

Figure 4:
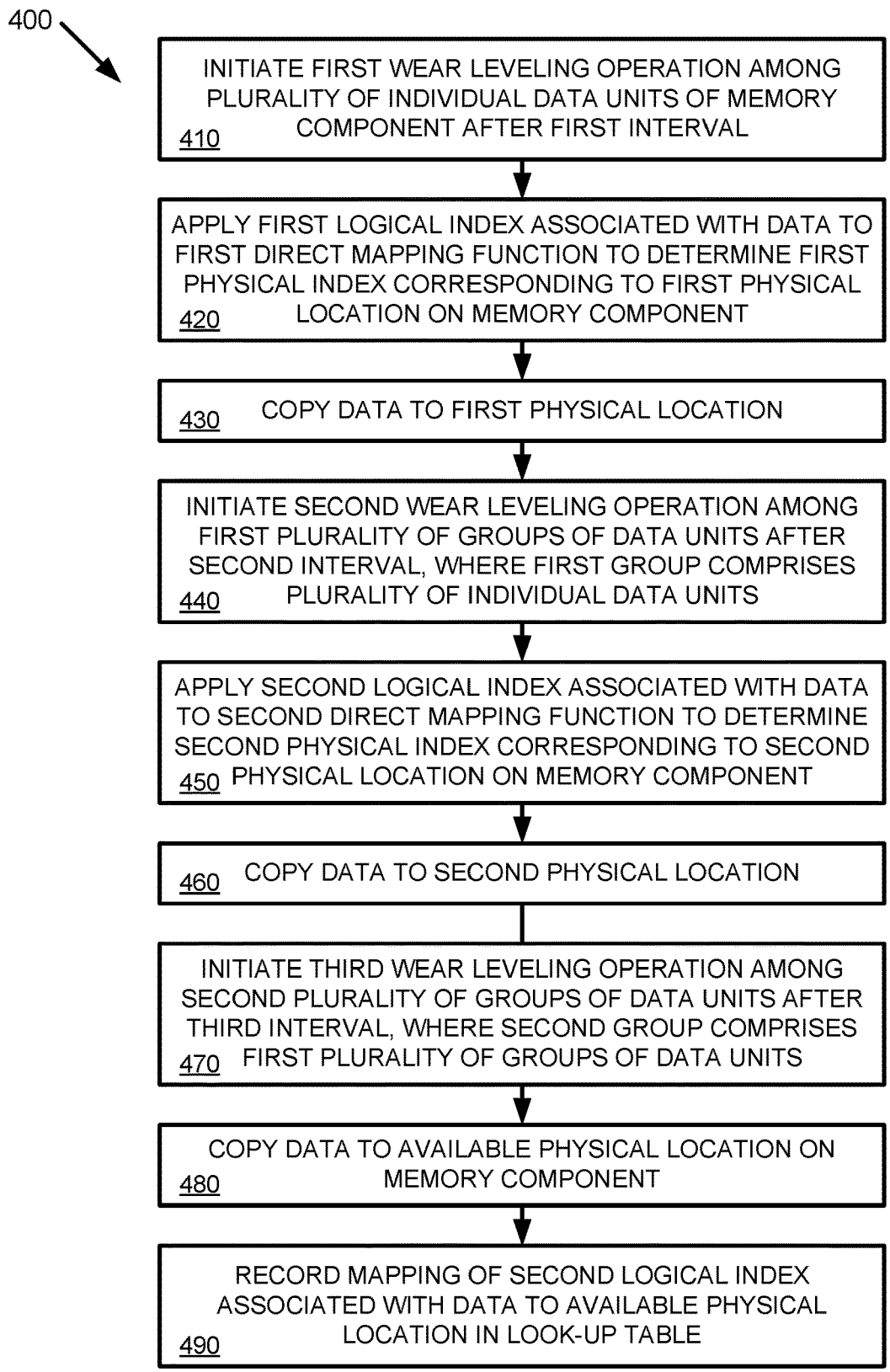
FIG. 4 is a flow diagram of an example method to perform multi-level wear leveling for non-volatile memory, in accordance with some embodiments of the present disclosure.

FIG. 4 is a flow diagram of an example method 400 to perform multi-level wear leveling for non-volatile memory, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the wear leveling management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 410, the processing device initiates a first wear leveling operation among a plurality of individual data units of the memory component 112A after a first interval. Wear leveling management component 113 can use an algebraic mapping function, which can include any mathematical function, such as an algebraic function, that is complete in and of itself and does require the use of any additional information in order to determine the target physical location in memory component 112A. The first wear leveling operation can occur at the first level using algebraic algebraic mapping after a first interval, which is configurable to the specific implementation, such as every five minutes or every 1000 host writes.

At block 420, the processing device applies a first logical index associated with data from one of the individual data units in the first level of the hierarchy to the algebraic mapping function to determine a physical index corresponding to a physical location on the memory component 112A. In one embodiment, the algebraic mapping function comprises at least one of a swap function, a circular shift function, a linear function utilizing a base pointer value and a free pointer value, etc. At block 430, the processing device copies the data from the individual data management unit to that physical location.

At block 440, the processing device initiates a second wear leveling operation among a first plurality of groups of data units of the memory component 112A after a second interval. At least one of the first plurality of groups of data units can include the individual data units from block 410. At block 430, wear leveling management component 113 can again use an algebraic mapping function, which can include any mathematical function, such as an algebraic function, and which can be the same or different than the function used at block 410. The second wear leveling operation can occur at the second level using algebraic mapping after a second interval, which is configurable to the specific implementation, such as every 30 minutes or every 5000 host writes.

At block 450, the processing device applies a second logical index associated with data from one of the groups of data units in the second level of the hierarchy to the algebraic mapping function to determine a physical index corresponding to a physical location on the memory component 112A. In one embodiment, the algebraic mapping function comprises at least one of a swap function, a circular shift function, a linear function utilizing a base pointer value and a free pointer value, etc. At block 460, the processing device copies the data from the individual data management unit to that physical location.

At block 470, the processing device initiates a third wear leveling operation on a second plurality of groups of data units of the memory component 112A after a third interval. At least one of the second plurality of groups of data units can include the first plurality of groups from block 440. At block 470, wear leveling management component 113 can again use an algebraic mapping function, or can use indirect mapping. With indirect mapping addition information is required in order to target the target physical location on memory component 112A. The third wear leveling operation can occur at the third level using indirect fully associative mapping implemented by a look-up table after a third interval, which is configurable to the specific implementation, such as every one hour or every 10,000 host writes.

At block 480, the processing device copies data from the second plurality of groups of data units to an available physical location on the memory component 112A. This physical location can be determined in any number of ways, such as a location having a lowest write count, a location having been least recently accessed, etc.

At block 490, the processing device records a mapping of a logical index associated with the data from the group of data management units to the available physical location in a look-up table. Upon copying the data, wear leveling management component 113 records a mapping of a logical index associated with the data from the second plurality of groups of data units to the available physical location in a look-up table (e.g., look-up table 290). In one embodiment, the look-up table is maintained in local memory 119 of controller 115. In other embodiments, the mapping can be maintained in some other type of data structure, such as an array, linked list, etc.

Figure 5:
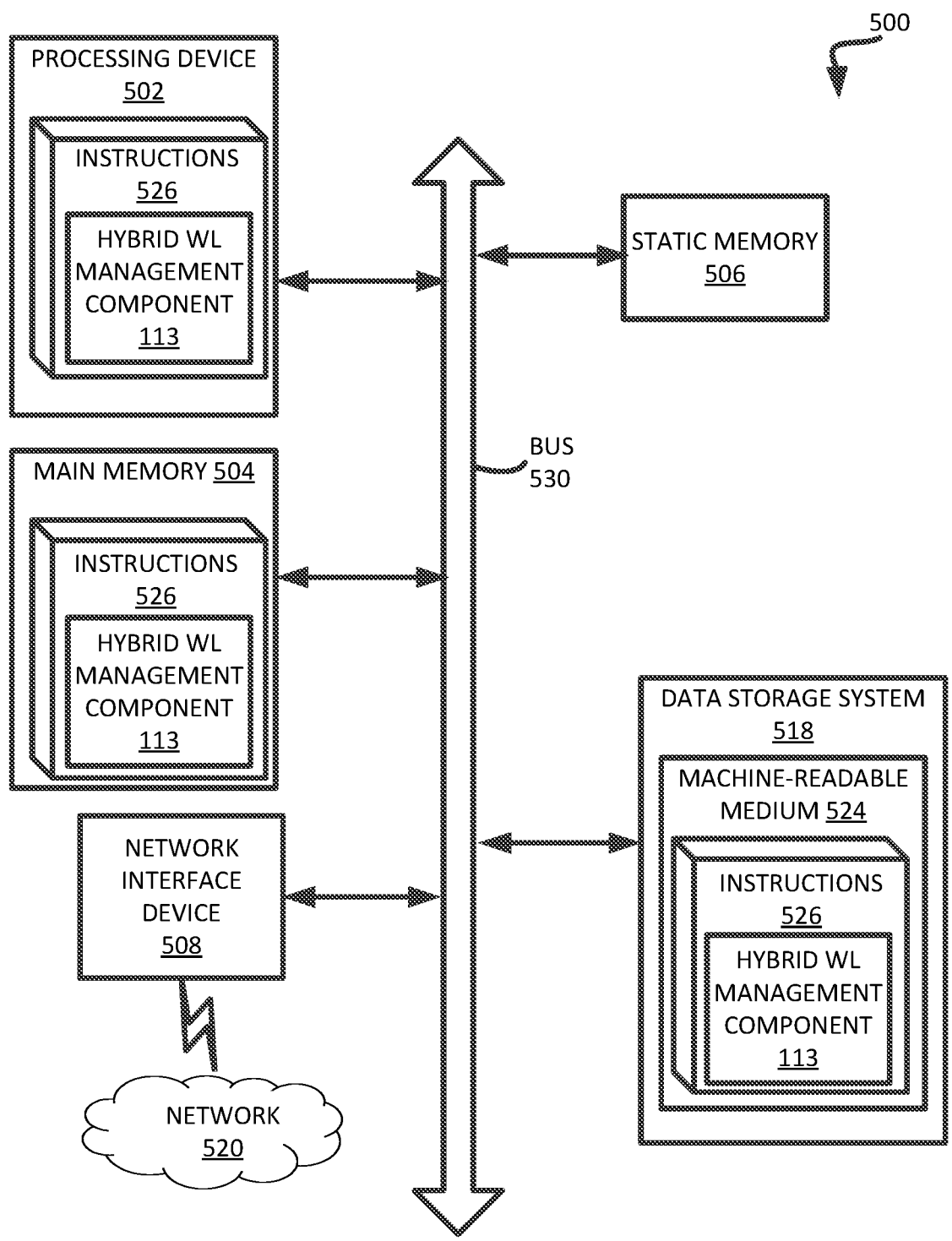
FIG. 5 is a block diagram of an example machine of a computer system in which implementations of the disclosure can operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the wear leveling management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a component (e.g., the wear leveling management component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   performing, by a processing device, a first wear leveling operation among a plurality of individual data units of a memory component after a first interval;
   performing, by the processing device, a second wear leveling operation among a plurality of first-level groups of individual data units in a hierarchy of groups of the memory component after a second interval, wherein at least one first-level group of the plurality of first-level groups comprises the plurality of individual data units; and
   performing, by the processing device, a third wear leveling operation among a plurality of second-level groups of data units of the memory component after a third interval, wherein at least one second-level group of the plurality of second-level groups comprises the plurality of first-level groups of individual data units.

2. The method of claim 1, wherein the first interval is shorter than the second interval, and wherein the second interval is shorter than the third interval.

3. The method of claim 1, wherein performing the first wear leveling operation among the plurality of individual data units comprises using a first algebraic mapping function, and wherein performing the second wear leveling operation among the plurality of first-level groups of data units comprises a second algebraic mapping function.

4. The method of claim 3, wherein the second algebraic mapping function is different than the first algebraic mapping function.

5. The method of claim 3, wherein performing the third wear leveling operation among the plurality of second-level groups of data units comprises using at least one of a third algebraic mapping function or indirect mapping.

6. The method of claim 5, wherein using at least one of the first, second or third algebraic mapping functions comprises:
   applying a first logical index associated with data to the at least one of the first, second or third algebraic mapping functions to determine a physical index corresponding to a physical location on the memory component; and
   copying the data to the physical location.

7. The method of claim 5, wherein using indirect mapping comprises:
   copying data to an available physical location on the memory component; and
   recording a mapping of a second logical index associated with the data to the available physical location in a look-up table.

8. The method of claim 1, wherein the first, second and third intervals are based on at least one of a period of time that has elapsed since a previous wear leveling operation was performed or a number of data write operations performed on the memory component by a host machine since the previous wear leveling operation was performed.

9. A system comprising:
   a memory component; and
   a processing device, operatively coupled with the memory component, to:
      perform a first wear leveling operation among a plurality of individual data units of the memory component after a first interval;
      perform a second wear leveling operation among a plurality of first-level groups of individual data units in a hierarchy of groups of the memory component after a second interval, wherein at least one first-level group of the plurality of first-level groups comprises the plurality of individual data units; and
      perform a third wear leveling operation among a plurality of second-level groups of data units of the memory component after a third interval, wherein at least one second-level group of the plurality of second-level groups comprises the first plurality of first-level groups of individual data units.

10. The system of claim 9, wherein the memory component comprises a cross-point array of non-volatile memory cells.

11. The system of claim 9, wherein the first interval is shorter than the second interval, and wherein the second interval is shorter than the third interval.

12. The system of claim 9, wherein to perform the first wear leveling operation among the plurality of individual data units, the processing device to use a first algebraic mapping function, and wherein to perform the second wear leveling operation among the plurality of first-level groups of data units, the processing device to use a second algebraic mapping function.

13. The system of claim 12, wherein the second algebraic mapping function is different than the first algebraic mapping function.

14. The system of claim 12, wherein to perform the third wear leveling operation among the plurality of second-level groups of data units, the processing device to use at least one of a third algebraic mapping function or indirect mapping.

15. The system of claim 14, wherein to use at least one of the first, second or third algebraic mapping functions, the processing device to:
   apply a first logical index associated with data to the at least one of the first, second or third algebraic mapping functions to determine a physical index corresponding to a physical location on the memory component; and
   copy the data to the physical location.

16. The system of claim 14, wherein to use indirect mapping, the processing device to:
   copy data to an available physical location on the memory component; and
   record a mapping of a second logical index associated with the data to the available physical location in a look-up table.

17. The system of claim 9, wherein the first, second and third intervals are based on at least one of a period of time that has elapsed since a previous wear leveling operation was performed or a number of data write operations performed on the memory component by a host machine since the previous wear leveling operation was performed.

18. A non-transitory computer-readable storage medium comprising instructions that, when executed by a processing device, cause the processing device to:
   detect an occurrence of a first trigger;

redistribute a plurality of individual data units to different physical locations on a memory component in response to the occurrence of the first trigger;

detect an occurrence of a second trigger;

redistribute a plurality of first-level groups of individual data units in a hierarchy of groups to different physical locations on the memory component in response to the occurrence of the second trigger, wherein at least one first-level group of the plurality of first-level groups comprises the plurality of individual data units;

detect an occurrence of a third trigger; and redistribute a plurality of second-level groups of data units to different physical locations on the memory component in response to the occurrence of the third trigger, wherein at least one second-level group of the plurality of second-level groups comprises the plurality of first-level groups of individual data units.

19. The non-transitory computer-readable storage medium of claim 18, wherein the second trigger occurs less frequently than the first trigger, and wherein third trigger occurs less frequently than the second trigger.

20. The non-transitory computer-readable storage medium of claim 18, wherein to redistribute the plurality of individual data units, the processing device to use a first algebraic mapping function, wherein to redistribute the plurality of first-level groups of data units, the processing device to use a second algebraic mapping function, and wherein to redistribute the plurality of second-level groups of data units, the processing device to use at least one of a third algebraic mapping function or indirect mapping.

* * * * *